US011846800B2

(12) United States Patent
Fattal

(10) Patent No.: US 11,846,800 B2
(45) Date of Patent: Dec. 19, 2023

(54) MULTIVIEW DISPLAY AND METHOD HAVING SHIFTED COLOR SUB-PIXELS

(71) Applicant: LEIA INC., Menlo Park, CA (US)

(72) Inventor: David A Fattal, Menlo Park, CA (US)

(73) Assignee: LEIA INC., Menlo Park, CA (US)

( * ) Notice: Subject to any disclaimer, the term of this patent is extended or adjusted under 35 U.S.C. 154(b) by 95 days.

(21) Appl. No.: 17/511,459

(22) Filed: Oct. 26, 2021

(65) Prior Publication Data

US 2022/0050243 A1 Feb. 17, 2022

Related U.S. Application Data

(63) Continuation of application No. PCT/US2019/029730, filed on Apr. 29, 2019.

(51) Int. Cl.
*F21V 8/00* (2006.01)
*H04N 13/32* (2018.01)
(Continued)

(52) U.S. Cl.
CPC .......... *G02B 6/0068* (2013.01); *G02B 6/0025* (2013.01); *G02B 30/27* (2020.01);
(Continued)

(58) Field of Classification Search
CPC .... G02B 6/0068; G02B 6/0025; G02B 30/27; G02B 30/33; G02B 30/10; G02B 27/00;
(Continued)

(56) References Cited

U.S. PATENT DOCUMENTS 6,064,424 A 5/2000 van Berkel et al.
9,128,226 B2 9/2015 Fattal et al.
(Continued)

FOREIGN PATENT DOCUMENTS

GB 2428857 A 2/2007
JP 2006098775 A 4/2006
(Continued)

OTHER PUBLICATIONS

International Search Report and Written Opinion (ISRWO) by International Searching Authority (ISA) Korean Intellectual Property Office (KIPO) dated Jan. 28, 2020 (14 pages) for foreign counterpart parent International Application No. PCT/US2019/029730.

(Continued)

*Primary Examiner* — Anne M Hines
*Assistant Examiner* — Jose M Diaz
(74) *Attorney, Agent, or Firm* — J. Michael Johnson

(57) ABSTRACT

A multiview display includes an array of light valves having rows of a repeating plurality of color sub-pixels and arranged as a plurality of multiview pixels configured to modulate directional light beams as color pixels of views of a multiview image. A first row of the repeating plurality of color sub-pixels is offset from a second row of the repeating plurality of color sub-pixels in a row direction by an integer multiple of a width of a color sub-pixel. The offset of the first and second rows is configured to provide corresponding color sub-pixels in adjacent multiview pixels having different colors to mitigate color fringing associated with the color pixel of the multiview image.

20 Claims, 6 Drawing Sheets

(51) Int. Cl.
*H04N 13/324* (2018.01)
*H04N 13/312* (2018.01)
*G02B 30/33* (2020.01)
*G02B 30/27* (2020.01)

(52) U.S. Cl.
CPC .......... *G02B 30/33* (2020.01); *H04N 13/312* (2018.05); *H04N 13/32* (2018.05); *H04N 13/324* (2018.05)

(58) Field of Classification Search
CPC .... H04N 13/312; H04N 13/32; H04N 13/324; H04N 13/351
See application file for complete search history.

(56) References Cited

U.S. PATENT DOCUMENTS

| | | | |
|---|---|---|---|
| 9,201,270 B2 | 12/2015 | Fattal et al. |
| 9,298,168 B2 | 3/2016 | Taff et al. |
| 9,389,415 B2 | 7/2016 | Fattal et al. |
| 9,459,461 B2 | 10/2016 | Santori et al. |
| 9,557,466 B2 | 1/2017 | Fattal |
| 9,785,119 B2 | 10/2017 | Taff et al. |
| 9,958,691 B2 | 5/2018 | Huang |
| 10,345,505 B2 | 7/2019 | Fattal |
| 10,649,128 B2 | 5/2020 | Fattal et al. |
| 10,830,939 B2 | 11/2020 | Fattal et al. |
| 10,838,134 B2 | 11/2020 | Fattal et al. |
| 10,928,677 B2 | 2/2021 | Aieta et al. |
| 11,004,407 B2 | 5/2021 | Fattal et al. |
| 11,016,235 B2 | 5/2021 | Fattal et al. |
| 11,143,810 B2 | 10/2021 | Fattal et al. |
| 2007/0152997 A1 | 7/2007 | Lee |
| 2008/0136983 A1 | 6/2008 | Huang |
| 2009/0002262 A1 | 1/2009 | Fukushima et al. |
| 2009/0322986 A1 | 12/2009 | Wei et al. |
| 2012/0092339 A1 | 4/2012 | Pijlman et al. |
| 2012/0200807 A1 | 8/2012 | Wei et al. |
| 2013/0169518 A1 | 7/2013 | Wu et al. |
| 2013/0241964 A1 | 9/2013 | Ohyama et al. |
| 2013/0250568 A1 | 9/2013 | Koito et al. |
| 2014/0285642 A1 | 9/2014 | Hwang et al. |
| 2017/0195657 A1 | 7/2017 | Li et al. |
| 2017/0363794 A1 | 12/2017 | Wan et al. |
| 2018/0011237 A1 | 1/2018 | Fattal |
| 2018/0196194 A1 | 7/2018 | Fattal |

FOREIGN PATENT DOCUMENTS

| | | |
|---|---|---|
| WO | 2012038856 A1 | 3/2012 |
| WO | 2018213101 A1 | 11/2018 |
| WO | 2020139338 A1 | 7/2020 |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Reichelt et al., "Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

MULTIVIEW DISPLAY AND METHOD HAVING SHIFTED COLOR SUB-PIXELS

CROSS-REFERENCE TO RELATED APPLICATIONS

This application is a continuation patent application of and claims priority to International Patent Application No. PCT/US2019/029730, filed Apr. 29, 2019, the entire contents of which are incorporated by reference herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various other displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the limitations of passive displays associated with emitted light, many passive displays are coupled to an external light source. The coupled light source may allow these otherwise passive displays to emit light and function substantially as active displays. Examples of such coupled light sources are backlights. A backlight may serve as a source of light (often a panel backlight) that is placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example. Alternatively, the various colors may be implemented by field-sequential illumination of a display using different colors, such as primary colors.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide backlighting employing an array of light valves having a repeating plurality of color sub-pixels arranged in offset rows. In various embodiments consistent with the principles herein, a multiview display is provided. The multiview display comprises an array of light valves having a repeating plurality of color sub-pixels and arranged as a plurality of multiview pixels configured to modulate directional light beams as color pixels of views of a multiview image. A first row of the repeating plurality of the color sub-pixels is offset from or shifted with respect to a second row of the repeating plurality of color sub-pixels in the row direction. The offset or shift is configured to mitigate color fringing associated with multiview image.

Figure 1A:
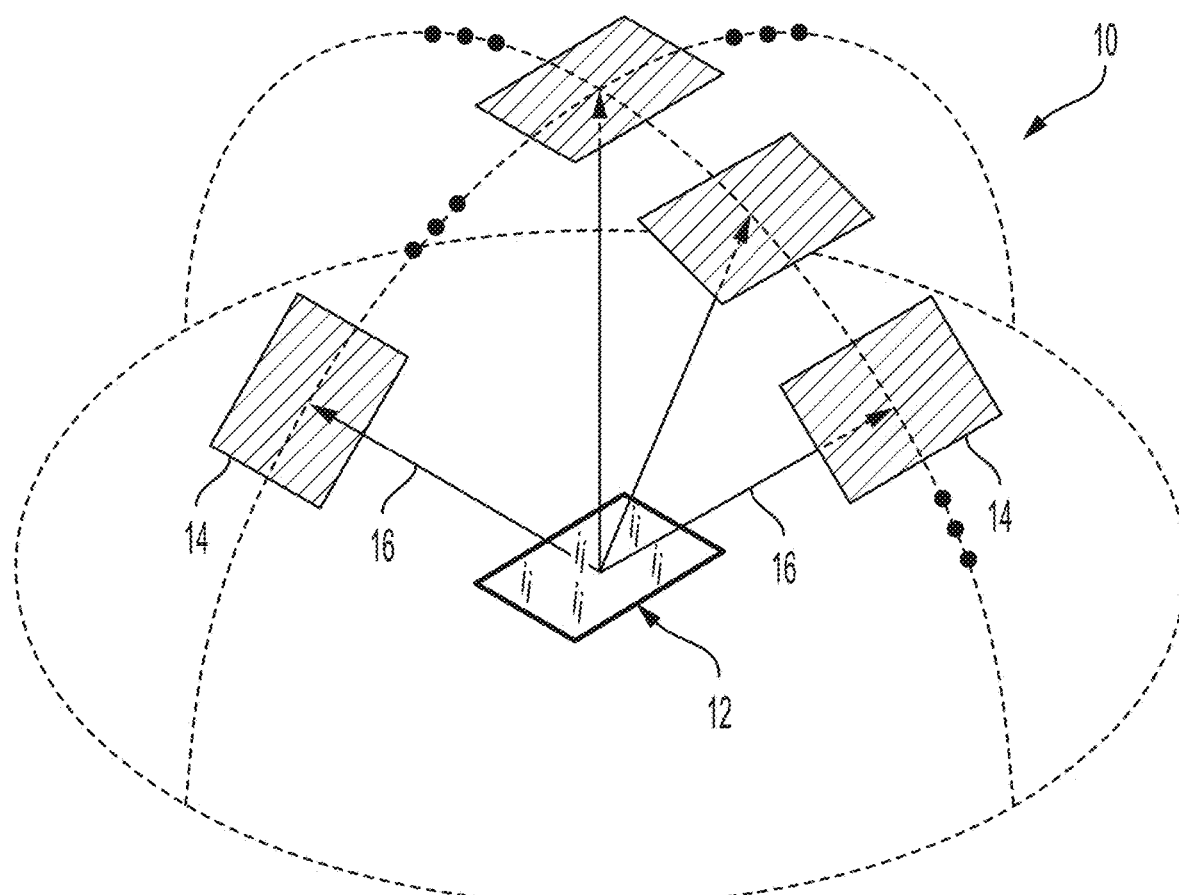
FIG. 1A illustrates a perspective view of a multiview display in an example, according to an embodiment consistent with the principles described herein.

Herein, a 'multiview display' is defined as an electronic display or display system configured to provide different views of a multiview image in different view directions. FIG. 1A illustrates a perspective view of a multiview display 10 in an example, according to an embodiment consistent with the principles described herein. As illustrated in FIG. 1A, the multiview display 10 comprises a screen 12 to display a multiview image to be viewed. The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14.

A view direction or equivalently a light beam having a direction corresponding to a view direction of a multiview display generally has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen) while the azimuth angle $\phi$ is an angle in a horizontal plane (e.g., parallel to the multiview display screen plane).

Figure 1B:
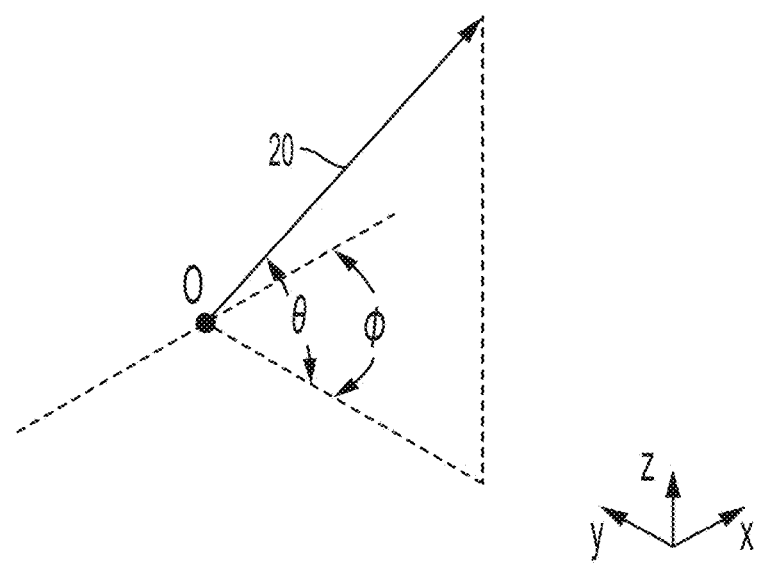
FIG. 1B illustrates a graphical representation of the angular components of a light beam having a particular principal angular direction corresponding to a view direction of a multiview display in an example, according to an embodiment consistent with the principles described herein.

FIG. 1B illustrates a graphical representation of the angular components $\{\theta, \phi\}$ of a light beam 20 having a particular principal angular direction corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set of pixels representing 'view' pixels in each of a similar plurality of different views of a multiview display. In particular, a multiview pixel may have an individual pixel or set of pixels corresponding to or representing a view pixel in each of the different views of the multiview image. By definition herein therefore, a 'view pixel' is a pixel or set of pixels corresponding to a view in a multiview pixel of a multiview display. In some embodiments, a view pixel may include one or more color sub-pixels. Moreover, the view pixels of the multiview pixel are so-called 'directional pixels' in that each of the view pixels is associated with a predetermined view direction of a corresponding one of the different views, by definition herein. Further, according to various examples and embodiments, the different view pixels a multiview pixel may have equivalent or at least substantially similar locations or coordinates in each of the different views. For example, a first multiview pixel may have individual view pixels located at $\{x1, y1\}$ in each of the different views of a multiview image, while a second multiview pixel may have individual view pixels located at $\{x2, y2\}$ in each of the different views, and so on.

In some embodiments, a number of view pixels in a multiview pixel may be equal to a number of views of the multiview display. For example, the multiview pixel may provide sixty-four (64) view pixels associated with a multiview display having 64 different views. In another example, the multiview display may provide an eight by four array of views (i.e., 32 views) and the multiview pixel may include thirty-two (32) view pixels (i.e., one for each view). Additionally, each different view pixel may have an associated direction (e.g., light beam principal angular direction) that corresponds to a different one of the view directions corresponding to the 64 different views, for example. Further, according to some embodiments, a number of multiview pixels of the multiview display may be substantially equal to a number of view pixels (i.e., pixels that make up a selected view) in the multiview display views each view of the multiview display. For example, if a view includes six hundred forty by four hundred eighty view pixels (i.e., a 640×480 view resolution), the multiview display may have three hundred seven thousand two hundred (307,200) multiview pixels. In another example, when the views include one hundred by one hundred pixels, the multiview display may include a total of ten thousand (i.e., 100×100=10,000) multiview pixels.

By definition herein, a 'multibeam emitter' is a structure or element of a backlight or a display that produces light that includes a plurality of light beams. In some embodiments, the multibeam emitter may be optically coupled to a light guide of a backlight to provide the light beams by coupling out a portion of light guided in the light guide. In such embodiments, a multibeam emitter may comprise a 'multibeam element.' In other embodiments, the multibeam emitter may generate light emitted as the light beams (i.e., may comprise a light source). Further, the light beams of the plurality of light beams produced by a multibeam emitter have different principal angular directions from one another, by definition herein. In particular, by definition, a light beam of the plurality has a predetermined principal angular direction that is different from another light beam of the light beam plurality. Furthermore, the light beam plurality may represent a light field. For example, the light beam plurality may be confined to a substantially conical region of space or have a predetermined angular spread that includes the different principal angular directions of the light beams in the light beam plurality. As such, the predetermined angular spread of the light beams in combination (i.e., the light beam plurality) may represent the light field. According to various embodiments, the different principal angular directions of the various light beams are determined by a characteristic including, but not limited to, a size (e.g., length, width, area, etc.) of the multibeam emitter. In some embodiments, the multibeam emitter may be considered an 'extended point light source', i.e., a plurality of point light sources distributed across an extent of the multibeam emitter, by definition herein. Further, a light beam produced by the multibeam emitter has a principal angular direction given by angular components $\{\theta, \phi\}$, by definition herein, and as described above with respect to FIG. 1B.

Herein, a 'multibeam column' is defined as an elongated structure comprising a plurality of multibeam elements arranged in a line or column. In particular, the multibeam column is made up of multibeam elements of the multibeam element plurality arranged in a line or column. Further, the multibeam column is configured to provide or emit light that includes a plurality of directional light beams, by definition. As such, the multibeam column may be functionally similar to the multibeam element with regard to its light scattering properties. That is, the directional light beams of the plurality of directional light beams produced by a multibeam element of the multibeam column have different principal angular directions from one another, by definition herein. In some embodiments, the multibeam column may be a narrow elongated structure that substantially extends across a width of a backlight or similar component of a multiview display. In particular, the multibeam column may be made up of a plurality of discrete multibeam elements arranged in a line that extends across the backlight width, for example. An exception to the definition above is that, the multibeam column comprises a single, continuous diffraction grating structure instead of individual discrete multibeam elements, in some embodiments. In the exception, a section of the continuous diffraction grating effectively functions in a manner that is substantially similar to the discrete multibeam element of the multibeam column described above.

According to various embodiments, a width of the multibeam column may be defined by a size of a multibeam element of the multibeam element plurality of the multibeam column. Thus, the width of the multibeam column may be comparable to a width of a light valve used in a multiview display that is associated with the multibeam column. Further, the multibeam column width may be between about one half and about two times the light valve size, in some embodiments.

Herein, an 'active emitter' or equivalently an 'active optical emitter' is defined as an optical emitter configured to produce or emit light when activated or turned on. An active emitter does not receive light from another source of light. Instead, the active emitter generates its own light when activated. An active emitter may comprise a light emitting diode (LED), a micro light emitting diode (μLED), or an organic light emitting diode (OLED), in some examples. The light produced by the active emitter may have a color (i.e., may include a particular wavelength of light), or may be a range of wavelengths (e.g., white light). By definition herein, a 'color emitter' is an active emitter that provides light having a color. In some embodiments, an active emitter may comprise a plurality of optical emitters. In some embodiments, at least one optical emitter in the active optical emitter may generate light having a color, or equivalently a wavelength, that differs from a color or wavelength of light produced by at least one other optical emitter of the plurality.

Herein, a 'light guide' is defined as a structure that guides light within the structure using total internal reflection. In particular, the light guide may include a core that is substantially transparent at an operational wavelength of the light guide. The term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

By definition, 'broad-angle' emitted light is defined as light having a cone angle that is greater than a cone angle of the view of a multiview image or multiview display. In particular, in some embodiments, the broad-angle emitted light may have a cone angle that is greater than about twenty degrees (e.g., >±20°). In other embodiments, the broad-angle emitted light cone angle may be greater than about thirty degrees (e.g., >±30°), or greater than about forty degrees (e.g., >±40°), or greater than about fifty degrees (e.g., >±50°). For example, the cone angle of the broad-angle emitted light may be greater than about sixty degrees (e.g., >±60°).

In some embodiments, the broad-angle emitted light cone angle may be defined to be about the same as a viewing angle of an LCD computer monitor, an LCD tablet, an LCD television, or a similar digital display device meant for broad-angle viewing (e.g., about ±40-65°). In other embodiments, broad-angle emitted light may also be characterized or described as diffuse light, substantially diffuse light, non-directional light (i.e., lacking any specific or defined directionality), or as light having a single or substantially uniform direction.

Herein, a 'light source' is defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

Further, as used herein, the article 'a' is intended to have its ordinary meaning in the patent arts, namely 'one or more'. For example, 'a color sub-pixel' means one or more color sub-pixels and as such, 'the color sub-pixel' means 'color sub-pixel(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 2:
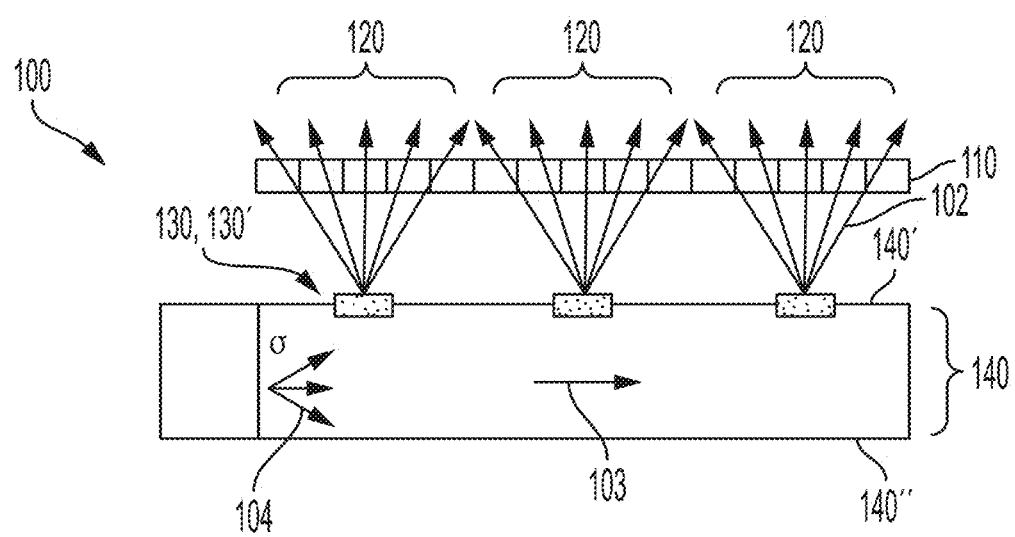
FIG. 2 illustrates a cross-sectional view of a multiview display in an example, according an embodiment consistent with the principles described herein.

According to some embodiments of the principles described herein, a multiview display is provided. FIG. 2 illustrates a cross-sectional view of a multiview display 100 in an example, according to an embodiment consistent with the principles described herein.

The multiview display 100 comprises an array of light valves 110. In various embodiments, different types of light valves may be employed as the light valves 110 of the light valve array including, but not limited to, one or more of liquid crystal light valves, electrophoretic light valves, and light valves based on electrowetting. The array of light valves 110 comprises a repeating plurality of color sub-pixels 112 configured to modulate directional light beams as color pixels of views of a multiview image.

Figure 3:
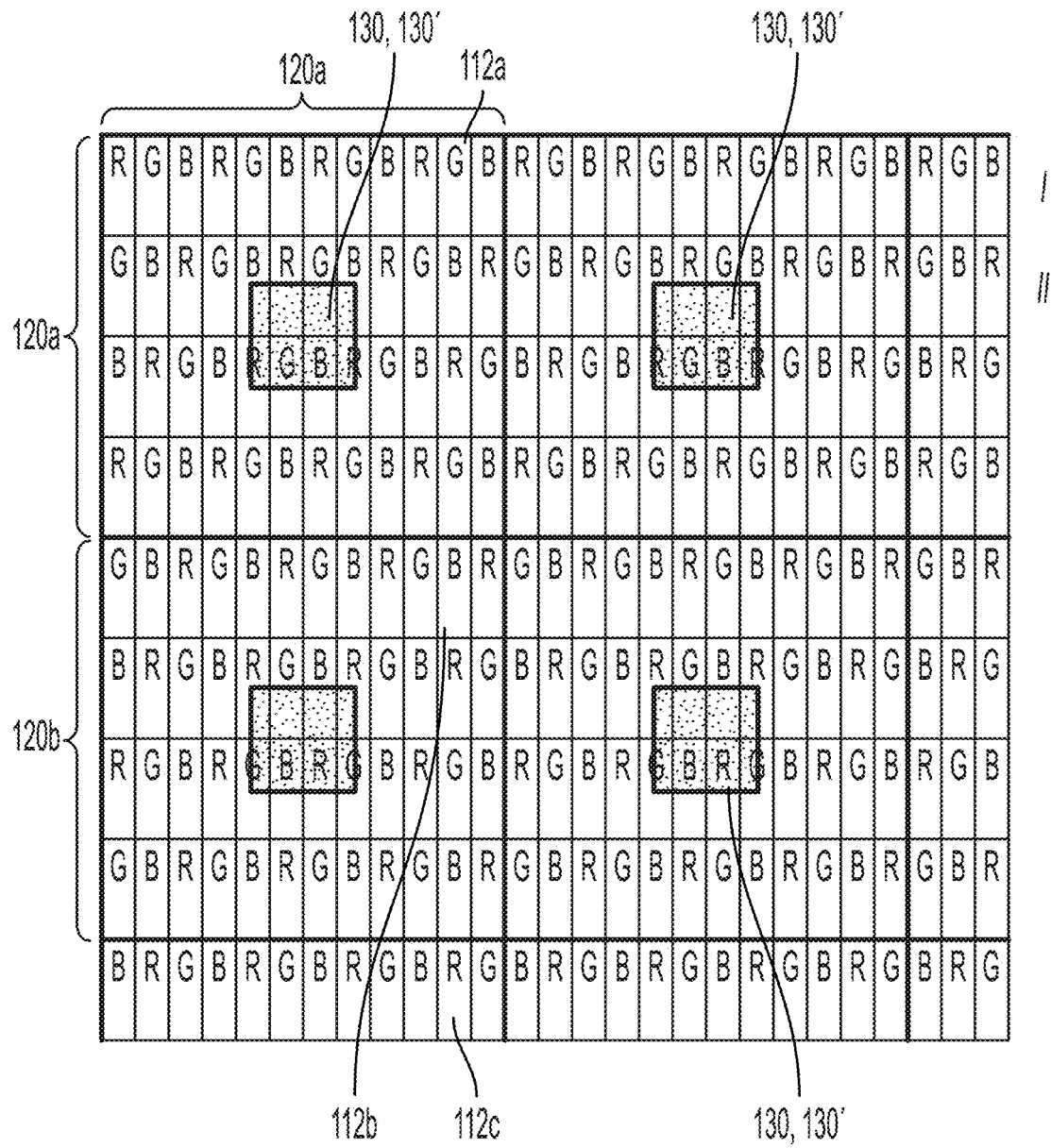
FIG. 3 illustrates a detailed view of a portion of an array of light valves of a multiview display in an example, according to an embodiment consistent with the principles described herein.

FIG. 3 illustrates a detailed view of a portion of an array of light valves 110 of a multiview display 100 in an example, according to an embodiment consistent with the principles described herein. The array of light valves 110 comprises a repeating plurality of color sub-pixels 112. In some embodiments, each color sub-pixel 112 of the repeating plurality of color sub-pixels has a different color. In the embodiment illustrated, the repeating plurality of color sub-pixels 112 consists of a repeating set of red, blue, and green color sub-pixels (RGB) in this order along a row of the array of light valves 110 (each color of a color sub-pixel of the repeating plurality of color sub-pixels is denoted with a corresponding initial in the figure). In other embodiments, the repeating plurality of color sub-pixels 112 may comprise a repeating set of red, blue, green, and yellow color sub-pixels (RGBY). In yet another embodiment, the repeating set may include red, blue, green, and white pixels (RGBW).

As illustrated on FIG. 3, the repeating plurality of color sub-pixels is arranged as a plurality of multiview pixels 120 of the multiview display 100. Each multiview pixel 120 of the plurality of multiview pixels comprises a different subset of the repeating plurality of color sub-pixels 112. Each multiview pixel 120 is configured to modulate directional light beams as color pixels of views of the multiview display 100. The modulated light beams represent the respective different colors of the color sub-pixels 112 of the plurality within the color pixels of the multiview display 100. In the embodiment illustrated, the multiview display 100 is a 4×4 display (i.e., offers 16 views in full parallax mode). Accordingly, each multiview pixel 120 of the plurality provides sixteen color view pixels corresponding to sixteen color pixels of sixteen different views of the multiview image. Each color view pixel comprises a set of three consecutive color sub-pixels 112 including a red color sub-pixel 112, a green color sub-pixel 112, and a blue color sub-pixel 112. The plurality of multiview pixels 120 may be arranged in rows and columns of multiview pixels 120.

A first row of the repeating plurality of color sub-pixels 112 is offset from or shifted with respect to a second row of the repeating plurality of color sub-pixels 112. FIG. 3 illustrates a first row I of the repeating plurality of color sub-pixels 112 being offset from a second row II of the repeating plurality of color sub-pixels 112. The first row I and the second row II are offset in the row direction, such that within a column of the color sub-pixels 112, a color sub-pixel 112 of the first row I has a different color from a color sub-pixel 112 of the second row II. In the embodiment illustrated, the first row I and the second row II are adjacent. Further, the offset (or equivalently, the offset distance) between the first row I and the second row II of the repeating plurality of color sub-pixels 112 is equal to an integer multiple of a width of a color sub-pixel 112. In the embodiment illustrated in FIG. 3, the first row I of the repeating plurality of color sub-pixels 112 is offset or shifted from the second row II of the repeating plurality of color sub-pixels 112 by a distance of one width of a color sub-pixel 112 in the direction of the repeating plurality of color sub-pixels 112. In other embodiments, the offset distance or shift distance between the first row I and the second row II may amount to two widths of a color sub-pixel 112, for example.

The offset or shift between the first row I and the second row II is configured to provide corresponding color sub-pixels 112 in adjacent multiview pixels 120 with or having different colors. FIG. 3 illustrates the corresponding color sub-pixels 112 in a set of adjacent multiview pixels 120a, 120b having different colors as a result of the offset between the first row I and the second row II of the repeating plurality of color sub-pixels 112. For example, a first color sub-pixel 112a of the illustrated multiview pixel 120a may have a green color, which differs from a blue color of a corresponding color sub-pixel 112b of an adjacent multiview pixels 120b due to the offset. Similarly, the offset results in corresponding color sub-pixels 112b, 112c having different colors, i.e., blue and red, respectively. The different colors of the corresponding colors sub-pixels 112, provided by the offset of rows in adjacent multiview pixels may serve to mitigate color fringing associated with the color pixel of the multiview display 100, according to some embodiments.

In some embodiments (e.g., as illustrated in FIGS. 2 and 3), the multiview display 100 may further comprises an array of multibeam emitters 130. The multibeam emitters 130 are configured to provide the directional light beams modulated by the plurality of color sub-pixels 112. The directional light beams may have principal angular directions corresponding to respective different view directions of the multiview display 100. In particular, FIG. 2 illustrates the directional light beams 102 as a plurality of diverging arrows depicted as being directed away from the multibeam emitters 130 of the multibeam emitter array.

In some embodiments, the multibeam emitters 130 of the array may be located at or adjacent to a first (top) surface of a substrate that supports the multibeam emitters 130 or equivalently a 'multibeam backlight,' as illustrated in FIG. 2. In other embodiments (not illustrated), the plurality of multibeam emitters 130 may be located on a second (or bottom) surface of the multibeam backlight, opposite to the first surface. In yet other embodiments (not illustrated), the multibeam emitters 130 of the multibeam emitter array may be located inside the multibeam backlight between the first surface and the second surface.

In some embodiments, a size of the multibeam emitter 130 is comparable to a size of a light valve 110 of the multiview display 100. Herein, the 'size' may be defined in any of a variety of manners to include, but not be limited to, a length, a width or an area. For example, the size of a light valve 110 may be a length thereof and the comparable size of the multibeam emitter 130 may also be a length of the multibeam emitter 130. In another example, size may refer to an area such that an area of the multibeam emitter 130 may be comparable to an area of the light valve 110. In some embodiments, the size of the multibeam emitter is comparable to the light valve size such that the multibeam emitter size is between about fifty percent (50%) and about two hundred percent (200%) of the light valve size.

As illustrated in FIGS. 2 and 3, different subsets of color sub-pixels 112 of the repeating plurality of color sub-pixels 112 of the array of light valves 110 correspond to different multibeam emitter 130 of the multibeam emitter array. Further, each of the different subsets of color sub-pixels 112 may represent a multiview pixel 120 of the multiview display 100, as illustrated. As such, a relationship between the multibeam emitters 130 of the multibeam emitter array and corresponding multiview pixels 120 (e.g., sets of light valves 110) may be a one-to-one relationship, in some embodiments. That is, there may be an equal number of multiview pixels 120 and multibeam emitters 130. FIGS. 2 and 3 illustrate by way of example and not limitation a one-to-one relationship where each multiview pixel 120 comprising a different set of light valves 110 is illustrated as surrounded by a thicker line.

Figure 4:
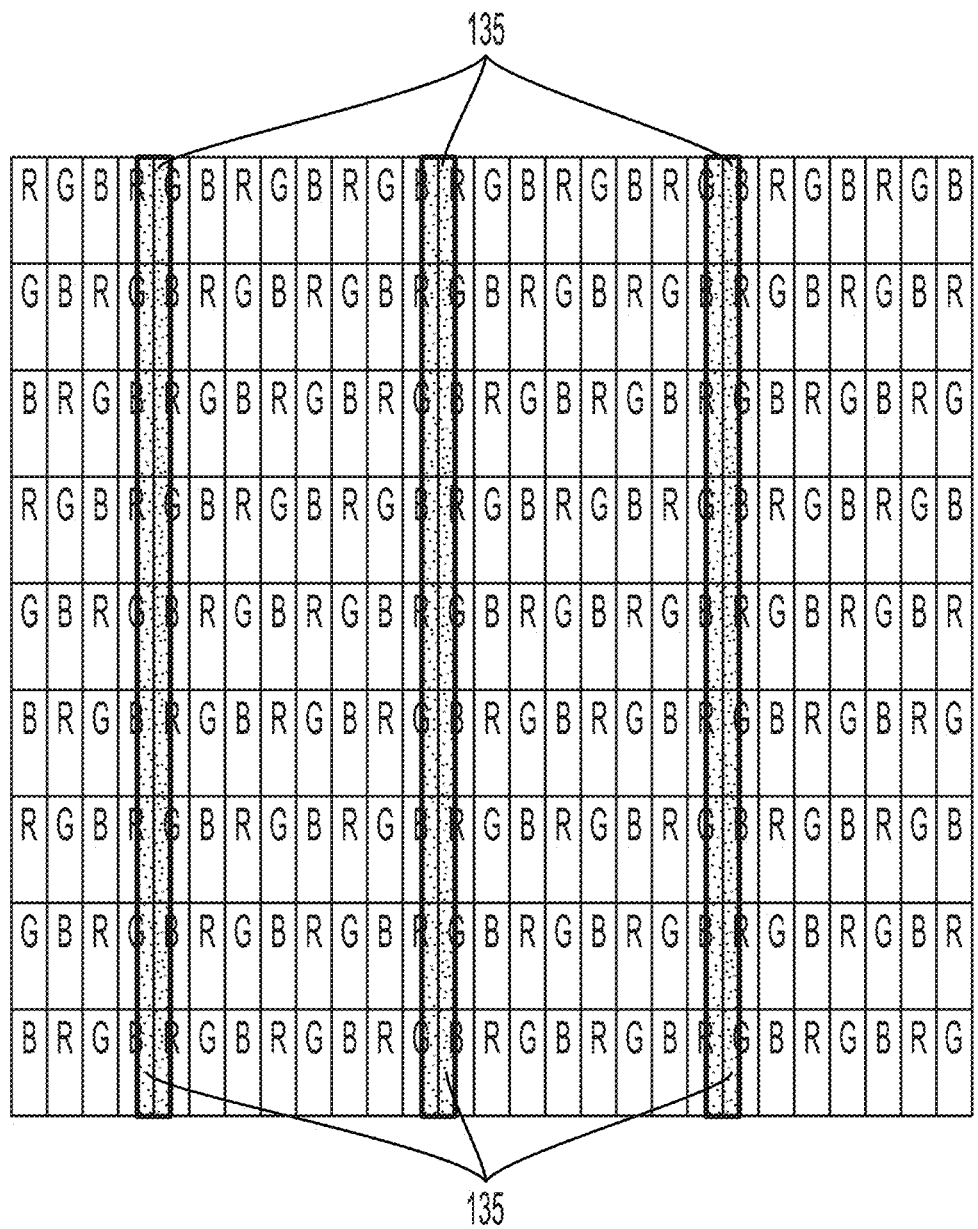
FIG. 4 illustrates a detailed view of a portion of an array of light valves of a multiview display in an example, according to an embodiment consistent with the principles described herein.

FIG. 4 illustrates a plan view of another multiview display 100 in an example, according to an embodiment consistent with the principles described herein. The multiview display 100 illustrated may represent a horizontal parallax multiview display. For example, as illustrated multiview display 100 may be an 8×1 horizontal parallax multiview display. In the illustrated embodiment, the multiview display 100 as a horizontal parallax multiview display comprises a plurality of multibeam columns 135 spaced apart along a length of the multiview display 100. A multibeam column 135 of the plurality of multibeam columns is configured to provide the directional light beams in a horizontal-only directional pattern. The directional light beams provided by the plurality of multibeam columns 135 are modulated by array of light valves 110 having offset rows of the repeating plurality of color sub-pixels 112, e.g., as described above. The directional light beams may have principal angular directions corresponding to respective different view directions of the multiview display 100, views corresponding to the different view directions being arranged in a horizontal-only arrangement corresponding to the horizontal-only directional pattern.

As with the multiview display 100 of FIG. 3, a first row I of the repeating plurality of color sub-pixels 112 is offset or shifted from a second row II of the repeating plurality of color sub-pixels 112 of the multiview display 100 illustrated in FIG. 4. Further, the first row I and the second row II are offset in the row direction, such that within a column of the color sub-pixels 112, a color sub-pixel 112 of the first row I has a different color from a color sub-pixel 112 of the second row II. According to various embodiments, an offset distance or shift distance between rows may be equal to an integer multiple of a width of a color sub-pixel 112, e.g., a width of a single color sub-pixel 112. The offset distance may result in the color sub-pixels 112 of the repeating plurality of color sub-pixels 112 to be arranged in parallel slanted vertical stripes for each color of the plurality. As with the embodiments of FIGS. 2 and 3, this arrangement of color sub-pixels 112 as slanted vertical stripes may serve to mitigate color fringing associated with the color pixel of the multiview display 100, in some embodiments. Further, the slanted stripes arrangement of color sub-pixels 112 may prevent a view shift in the horizontal direction when the head of the viewer moves in the vertical direction or along the multibeam columns.

In some embodiments, the plurality of multibeam columns 135 is the array of multibeam emitters 130. That is, a multibeam column 135 of the multibeam column plurality may comprise a plurality of multibeam emitters 130 of the array of multibeam emitters arranged in a column. Further, the multibeam emitters 130 of each multibeam column may be separated by a distance that is less than a width of a size of a multibeam emitter 130, in some embodiments. In some embodiments, multibeam emitters 130 of a multibeam column 135 may be separated by a distance comparable to a distance separating adjacent light valves 110 of the array of light valves. In some embodiments, the multibeam column 135 may comprise a continuous multibeam emitter 130 or a single elongated multibeam emitter 130.

Referring back to FIG. 2, in some embodiments, the multiview display 100 further comprises a light guide 140. The light guide 140 is configured to guide light along a length of the light guide as guided light 104 (i.e., a guided light beam 104). For example, the light guide 140 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 104 according to one or more guided modes of the light guide 140, for example.

The light guide 140 may be a slab or plate of an optical waveguide (i.e., a plate light guide) comprising an extended, substantially planar sheet of optically transparent, dielectric material. The substantially planar sheet of dielectric material is configured to guide the guided light 104 using total internal reflection. According to various examples, the optically transparent material of the light guide 140 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 140 may further include a cladding layer (not illustrated) on at least a portion of a surface (e.g., one or both of the first surface and the second surface) of the light guide 140. The cladding layer may be used to further facilitate total internal reflection, according to some examples.

According to various embodiments, the light guide 140 is configured to guide the guided light 104 according to total internal reflection at a non-zero propagation angle between a first surface 140' (e.g., front or top surface or side) and a second surface 140" (e.g., back or bottom surface or side) of the light guide 140. In particular, the guided light 104 propagates by reflecting or 'bouncing' between the first surface 140' and the second surface 140" of the light guide 140 at the non-zero propagation angle. In some embodiments, a plurality of guided light beams 104 comprising different colors of light may be guided by the light guide 140 at respective ones of different color-specific, non-zero propagation angles. Note, the non-zero propagation angle is not illustrated in FIG. 2 for simplicity of illustration. However, a bold arrow depicting a propagation direction 103 illustrates a general propagation direction of the guided light 104 along the light guide length in FIG. 2.

According to some embodiments, the multibeam emitter 130 may comprise a multibeam element 130'. In particular, the multiview display 100 that includes the light guide 140 may further comprise an array of multibeam elements 130' corresponding to the array of multibeam emitters 130. As such, the multibeam element array is the multibeam emitter array, each multibeam element 130' of the multibeam element array may correspond to a different multibeam emitter 130 of the multibeam emitter array, in some embodiments. According to various embodiments, the multibeam elements 130' of the array are spaced apart from one another along a length of the light guide 140. The multibeam elements 130' of the array may be located at or adjacent to the first (or 'top') surface 140' of the light guide 140, for example as illustrated in FIG. 2. In other embodiments, the multibeam elements 130' of the array may be located on the second (or 'bottom') surface 140" of the light guide 140 or inside the light guide 140 between the first and second surfaces 140' and 140".

According to various embodiments, the multibeam element 130' of the multibeam element array is configured to scatter out light from the light guide 140 as the plurality of directional light beams having principal angular directions corresponding to view directions of different views the multiview image or equivalently of the multiview display 100. According to various embodiments, the multibeam element 130' may comprise any of a number of different structures configured to scatter out a portion of the guided light 104 as directional light beams. For example, the different structures may include, but are not limited to, diffraction gratings, micro-reflective elements, micro-refractive elements, or various combinations thereof. In some embodiments, the multibeam element 130' comprising a diffraction grating is configured to diffractively scatter out the guided light portion as the plurality of directional light beams having the different principal angular directions. In other embodiments, the multibeam element 130' comprising a micro-reflective element is configured to reflectively scatter out the guided light portion as the plurality of directional light beams, or the multibeam element 130' comprising a micro-refractive element is configured to scatter out the guided light portion as the plurality of directional light beams by or using refraction (i.e., refractively scatter out the guided light portion).

In other embodiments (not illustrated), the multibeam emitters 130 may comprise an active optical emitter such as, but not limited to, a light emitting diode (LED), a micro light emitting diode (μLED) and a micro organic light emitting diode (μOLED). In these embodiments, the light guide 140 and a light source configured to provide light to be guided as the guided light within the light guide 140 may be omitted. Instead, the light guide 140 may be replaced by a substrate to support and provide power to the multibeam emitters 130, as mentioned above.

Figure 5:
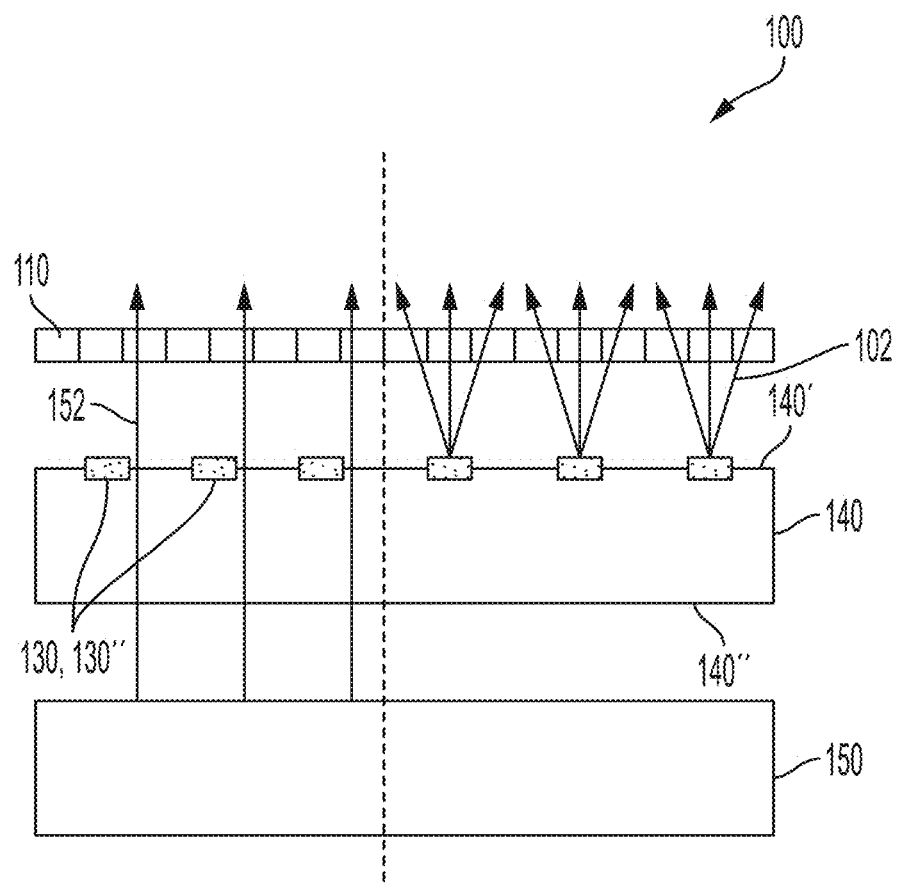
FIG. 5 illustrates a cross-sectional view of a multiview display comprising a broad-angle backlight in an example, according to an embodiment of the principles described herein.

In some embodiments, the multiview display 100 further comprises a broad-angle backlight 150 adjacent to the light guide 140. FIG. 5 illustrates a cross-sectional view of a multiview display 100 comprising a broad-angle backlight 150 in an example, according to an embodiment of the principles described herein. According to various embodiments, the broad-angle backlight 150 is opposite to a side of the light guide 140 adjacent to the light valve array. In particular, as illustrated, the broad-angle backlight 150 is adjacent to a bottom surface (i.e., the second surface 140") of the light guide 140. The broad-angle backlight 150 is configured to provide broad-angle light 152 as broad-angle emitted light.

According to some embodiments, the light guide 140 and the array of multibeam elements 130' may be configured to be optically transparent to light propagating substantially perpendicular to a surface of the light guide 140 (e.g., the first and second surfaces 140', 140") to facilitate passage of the light through a thickness of the light guide 140. In particular, as illustrated in FIG. 5, the light guide 140 and the array of multibeam elements 130' may be configured to be optically transparent to the broad-angle light 152 emitted from the adjacent broad-angle backlight 150. Thus, broad-angle light 152 may be emitted from the broad-angle backlight 150 and through the thickness of light guide 140. Therefore, the broad-angle light 152 from the broad-angle backlight 150 may be received through the bottom or second surface 140" of the light guide 140, transmitted through a thickness of the light guide 140, and emitted from a top surface (i.e., the first surface 140') of the light guide 140 toward the array of light valves 110. Because the light guide 140 is optically transparent to the broad-angle light 152, the broad-angle light 152 is not substantially affected by the light guide 140.

According to various embodiments, the multiview display 100 illustrated in FIG. 5 may selectively operate in a two-dimensional (2D) mode or a multiview mode. In the 2D mode, the multiview display 100 is configured to emit the broad-angle light 152 provided by the broad-angle backlight 150. In the multiview mode, the multiview display 100 is configured to emit the directional light beams 102 provided by the light guide 140, as previously described. The combination of the light guide 140 and broad-angle backlight 150 may be used in dual (2D/3D) display, for example.

Figure 6:
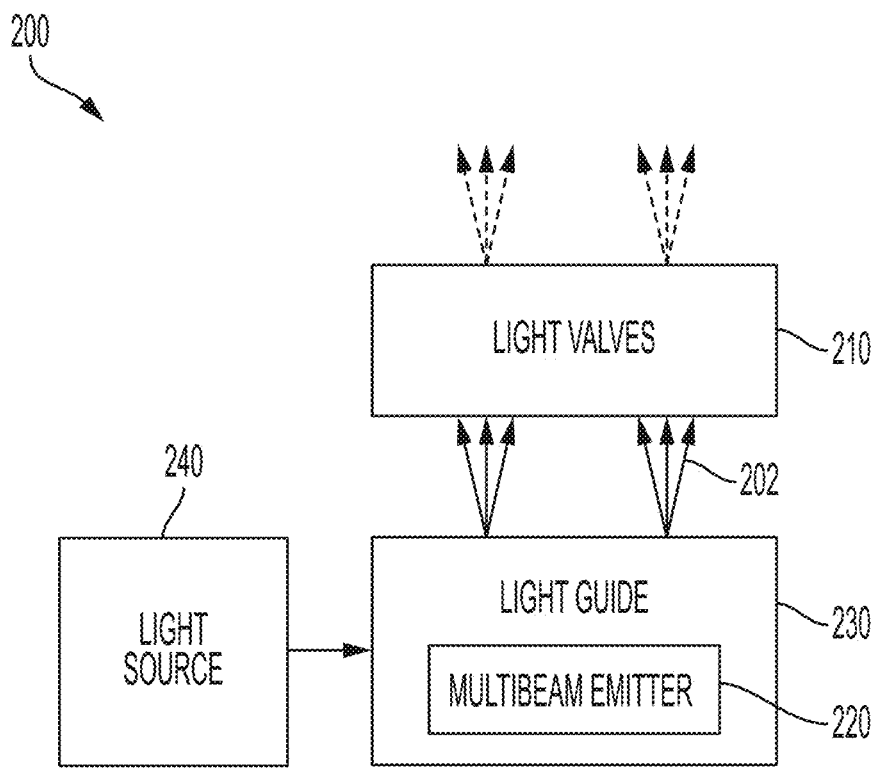
FIG. 6 illustrates a block diagram of a multiview display system in an example, according to an embodiment consistent with the principles herein.

In accordance with some embodiments of the principles described herein, a multiview display 200 is provided. FIG. 6 illustrates a block diagram of a multiview display 200 in an example, according to an embodiment consistent with the principles herein. The multiview display 200 comprises an array of light valves 210 having a repeating plurality of color sub-pixels arranged in offset rows. Light valves 210 of the light valve array are arranged as multiview pixels configured to modulate directional light beams as color pixels of a multiview image, according to various embodiments. In some embodiments, the light valves 210 of the array may be substantially similar to the light valves 110 of the multiview display 100, previously described. As such, different types of light valves may be employed as the light valves 110 of the light valve array including, but not limited to, one or more of liquid crystal light valves, electrophoretic light valves, and light valves based on electrowetting. In some embodiments, each color sub-pixel of the repeating plurality of color sub-pixels has a different color. For example, the repeating plurality of color sub-pixels may consist of a repeating set of red, blue, and green color sub-pixels (RGB) in this order along a row of the array of light valves 210. In other embodiments, the repeating plurality of color sub-pixels may comprise a repeating set of red, blue, green, and yellow color sub-pixels (RGBY). In yet another embodiment, the repeating set may include red, blue, green, and white pixels (RGBW).

The multiview display 200 further comprises an array of multibeam emitters 220 configured to illuminate different multiview pixels with different sets of directional light beams. In some embodiments, there may be a one-to-one relationship between a multibeam emitter 220 of the array of multibeam emitters 220 and a multiview pixel of the light valve array. The multibeam emitters 220 of the array may be substantially similar to the multibeam emitters 130 of the above-described multiview display 100, according to some embodiments. For example, the multibeam emitters 220 of the plurality are configured provide the directional light beams to be modulated by the array of light valves 210. According to various embodiments, the directional light beams have principal angular directions corresponding to respective different view directions of the multiview display 200. Further, the multibeam emitters 220 of the plurality may be located on a surface of or within a substrate used to support the multibeam emitters 220 (e.g., a light guide described below).

According to various embodiments, adjacent rows of the plurality of color sub-pixels are offset from one another by an integer multiple of a width of a color sub-pixel in or along a row direction. The offset or shift between the adjacent rows is configured to provide a color sub-pixel of a first multiview pixel having a different color than a corresponding color sub-pixel of a second multiview pixel, according to various embodiments. In some embodiments, the offset rows may be substantially similar to the rows having an offset between the first row of the array of color sub-pixels and the second row of the array of color sub-pixels, described above with respect to the multiview display 100. Further, according to the offset of adjacent offset rows of the plurality of color sub-pixels being an integer multiple of a width of a color sub-pixel, the adjacent rows may be offset or shifted by a distance of a width of a color sub-pixel (e.g., as illustrated in FIGS. 3 and 4 in reference to the multiview display 100) or two widths of a color sub-pixel, or three widths of a color sub-pixels, and so on.

In some embodiments, a multibeam emitter 220 of the multibeam emitter array comprises an active optical emitter. The active optical emitter is configured to emit light as the directional light beams. The directional light beams emitted by the active optical emitter have principal angular directions corresponding to the respective different view directions of the multiview display 200. The active optical emitter may comprise any number of different structures configured to emit light as a plurality of directional light beams. In some embodiments, the active optical emitter comprises, but is not limited to, a micro light emitting diode (µLED) or an organic light emitting diode (OLED). In some embodiments, the active optical emitter is configured to emit white light, while in other embodiments the active optical emitter may emit light comprising a particular color (e.g., may be a monochromatic active optical emitter).

Further, a size of the active optical emitter is comparable to a size of a light valve 210 of the light valve array. Herein, the 'size' may be defined in any of a variety of manners to include, but not be limited to, a length, a width or an area. For example, the size of a light valve 210 of the light valve array may be a length thereof and the comparable size of the active optical emitter may also be a length of the active optical emitter. In another example, size may refer to an area such that an area of the active optical emitter may be comparable to an area of the light valve 210 of the light valve array.

In other embodiments, the multibeam emitter 220 of the multibeam emitter array may be substantially passive. In particular, in some embodiments (e.g., as illustrated in FIG. 6), the multiview display 200 further comprises a light guide 230. The light guide 230 is configured to guide light in a propagation direction along a length of the light guide as guided light. In some embodiments, the light guide 230 may be substantially similar to the light guide 140 of the multiview display 100, previously described. According to various embodiments, the light guide 230 is configured to guide the guided light using total internal reflection. Further, the guided light may be guided at a non-zero propagation angle by or within the light guide 230. In some embodiments, the guided light may be collimated or may be a collimated light beam. In particular, the guided light may be collimated according to or having a collimation factor σ, in various embodiments.

In some embodiments (e.g., when the multibeam emitters 220 are passive), the multiview display 200 may further comprise an array of multibeam elements spaced apart from one another along the light guide length. The multibeam element is configured to scatter out a portion of the guided light within the light guide 230 as the directional light beams. Further, a multibeam element of the multibeam element array may correspond to a multibeam emitter of the multibeam emitter array, according to these embodiments. In some embodiments, a multibeam element of the array of multibeam elements may be substantially similar to the multibeam element 130' of the multiview display 100, described above. As such, the multibeam element is configured to illuminate different multiview pixels with different sets of the directional light beams. In particular, there may be a one-to-one relationship between a multibeam element of the array of multibeam elements and a multiview pixel of the array of multiview pixels. The multibeam element may be located on surface of or within the light guide 230.

In some embodiments, a size of the multibeam element is comparable to a size of a light valve 210 of the light valve array. In some embodiments, the size of the multibeam element is comparable to the light valve size such that the multibeam element size is between about fifty percent (50%) and about two hundred percent (200%) of the light valve size.

In some embodiments, the multibeam element may comprise any of a number of different structures configured to scatter out a portion of the guided light. For example, the different structures may include, but are not limited to, diffraction gratings, micro-reflective elements, micro-refractive elements, or various combinations thereof. In some embodiments, the multibeam element comprising a diffraction grating is configured to diffractively scatter out the guided light portion as the plurality of directional light beams having the different principal angular directions. In other embodiments, the multibeam element comprising a micro-reflective element is configured to reflectively scatter out the guided light portion as the plurality of directional light beams, or the multibeam element comprising a micro-refractive element is configured to scatter out the guided light portion as the plurality of directional light beams by or using refraction (i.e., refractively scatter out the guided light portion).

In some embodiments, the multiview display 200 may further comprise a light source 240. According to various embodiments, the light source 240 is configured to provide the light to be guided within light guide 230. In particular, the light source 240 may be located adjacent to an entrance surface or end (input end) of the light guide 230. In various embodiments, the light source 240 may comprise substantially any source of light (e.g., optical emitter) including, but not limited to, one or more light emitting diodes (LEDs) or a laser (e.g., laser diode). In some embodiments, the light source 240 may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model). In other examples, the light source 240 may be a substantially broadband light source configured to provide substantially broadband or polychromatic light. For example, the light source 240 may provide white light. In some embodiments, the light source 240 may comprise a plurality of different optical emitters configured to provide different colors of light. The different optical emitters may be configured to provide light having different, color-specific, non-zero propagation angles of the guided light corresponding to each of the different colors of light.

In some embodiments, the guided light may be collimated or equivalently may be a collimated light beam (e.g., provided by a collimator, as described below). Herein, a 'collimated light' or 'collimated light beam' is generally defined as a beam of light in which rays of the light beam are substantially confined to a predetermined or defined angular spread within the light beam (e.g., the guided light). Further, rays of light that diverge or are scattered from the collimated light beam are not considered to be part of the collimated light beam, by definition herein. Moreover, the guided light may be collimated according to or having a collimation factor σ, in various embodiments.

Figure 7:
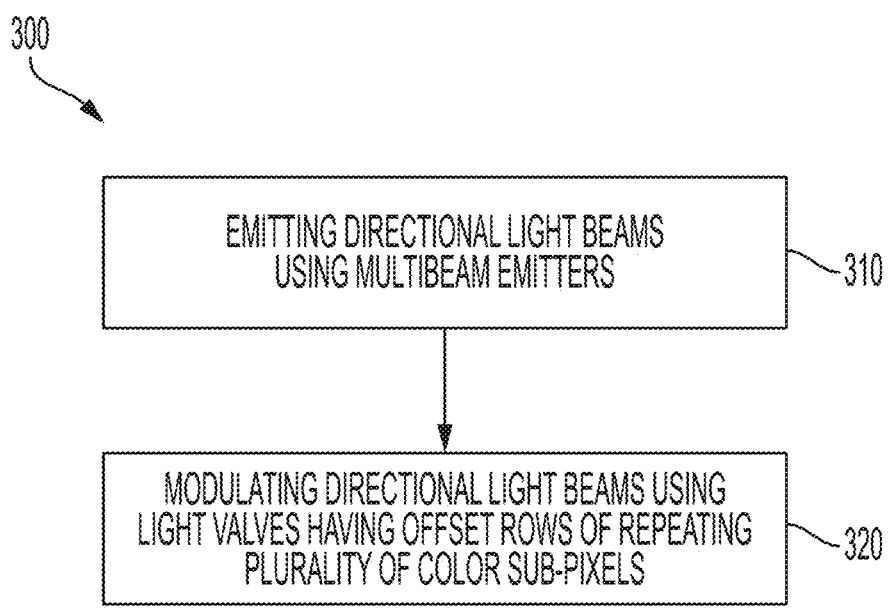
FIG. 7 illustrates a flowchart of a method of a multiview display system operation in an example, according to an embodiment consistent with the principles described herein.

According to some embodiments of the principles described herein, a method of multiview display operation is provided. FIG. 7 illustrates a flow chart of the method 300 of multiview display operation, according to an embodiment consistent with the principles described herein. As illustrated, the method 300 of multiview display operation comprises emitting 310 directional light beams using an array of multibeam emitters. In some embodiments, the multibeam emitters of the array may be substantially similar to the multibeam emitters 130 of the multiview display 100, previously described. In particular, the multibeam emitters of the multibeam emitter array may be arranged in rows and columns of multibeam emitters. The directional light beams have directions corresponding to different views directions of the multiview display.

The method 300 of multiview display operation further comprises modulating 320 the directional light beams using an array of light valves. The array of light valves comprises a repeating plurality of color sub-pixels arranged as a plurality of multiview pixels and the modulated directional light beams provide color pixels of different views of a multiview image displayed by the multiview display. According to some embodiments, the array of light valves may be substantially similar to the array of light valves 110 of the above-described multiview display 100. As such, different types of light valves may be employed as the light valves of the light valve array including, but not limited to, one or more of liquid crystal light valves, electrophoretic light valves, and light valves based on electrowetting.

In some embodiments, each color sub-pixel of the repeating plurality of color sub-pixels has a different color. For example, the repeating plurality of color sub-pixels may consist of a repeating set of red, blue, and green color sub-pixels (RGB) in this order along a row of the array of light valves, as illustrated in FIGS. 3 and 4 for the multiview display 100. In other embodiments, the repeating plurality of color sub-pixels may comprise a repeating set of red, blue, green, and yellow color sub-pixels (RGBY). In yet another embodiment, the repeating set may include red, blue, green, and white pixels (RGBW). The color sub-pixels of the repeating plurality of color sub-pixels are arranged along rows of the light valve array. Further, multibeam emitters of the multibeam emitter array are arranged in rows having a row direction corresponding to row direction of the rows of the light valve array.

According to various embodiments, rows of the repeating plurality of color sub-pixels of the light valve array are offset or shifted from one another. In particular, a first row of the repeating plurality of color sub-pixels is offset from a second row of the repeating plurality of color sub-pixels to provide corresponding color sub-pixels in adjacent multiview pixels with different colors. The offset of the rows is configured to mitigate color fringing associated with the color pixel of a multiview image being displayed by the multiview display. In some embodiments, the offset between the first and a second row may be substantially similar to the offset between the first and the second row as described in relation to the multiview display 100. For example, the offset or shift between the first and second rows of the repeating plurality of color sub-pixels may be equal to an integer multiple of a width of a color sub-pixel in a direction of the repeating plurality of color sub-pixels.

In some embodiments, emitting 310 the directional light beams comprises using a plurality of multibeam columns spaced apart from one another along a length of the multiview display to emit the directional light beams. In particular, multibeam column of the multibeam column plurality is configured to emit a plurality of directional light beams. The directional light beams have principal directions corresponding to view directions of the multiview display. In some embodiments, the plurality of multibeam columns is the array of multibeam emitters. That is, a multibeam column of the multibeam column plurality comprises a column of multibeam emitters of the array of multibeam emitters wherein the multibeam emitters are offset from one another in a row direction to form a slanted column of multibeam emitters. In some embodiments, the multibeam column may comprise a continuous multibeam element or a single elongated multibeam element. The multibeam columns may be employed in a horizontal parallax-only display where the views are arranged in a horizontal parallax arrangement, as illustrated in FIG. 4 for a horizontal parallax-only arrangement of the multiview display 100.

In some embodiments, emitting 310 directional light beams using an array of multibeam emitters comprises guiding light in a light guide as guided light. The light guide may be substantially similar to the light guide 140 of the multiview display 100, and light may be guided at a non-zero propagation angle between opposite internal surfaces of the light guide, in some embodiments. Emitting 310 the directional light beams using the array of multibeam emitters may further comprise scattering out a portion of the guided light using a multibeam element of an array of multibeam elements to provide the directional light beams. The multibeam element may be substantially similar to the multibeam element 130' of the multiview display 100. Further, the multibeam element may have a size comparable to a size of a light valve of the light valve array. For example, the size of the multibeam element may be comparable to the light valve size such that the multibeam element size is between about fifty percent (50%) and about two hundred percent (200%) of the light valve size. Further, the multibeam element may be the multibeam emitter array such that each multibeam element of the multibeam element array corresponds to a different multibeam emitter of the multibeam emitter array.

Thus, there have been described examples and embodiments of a multiview display and method comprising a repeating plurality of color sub-pixels arranged in rows and having an offset or shift configured to mitigate color fringing associated with the multiview image. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A multiview display comprising:
an array of light valves having rows of a repeating plurality of color sub-pixels and arranged as a plurality of multiview pixels configured to modulate directional light beams as color pixels of views of a multiview image, a first row of the repeating plurality of color sub-pixels being offset from a second row of the repeating plurality of color sub-pixels in a row direction by an integer multiple of a width of a color sub-pixel,
wherein the offset of the first and second rows is configured to provide corresponding color sub-pixels in adjacent multiview pixels having different colors to mitigate color fringing associated with the color pixel of the multiview image.

2. The multiview display of claim 1, wherein each color sub-pixel of the repeating plurality of color sub-pixels has a different color, the modulated light beams representing the respective different colors within the color pixels of the multiview image.

3. The multiview display of claim 2, wherein the repeating plurality of color sub-pixels comprises a red color sub-pixel, a green color sub-pixel, and a blue color sub-pixel.

4. The multiview display of claim 1, further comprising an array of multibeam emitters spaced apart from one another and configured to provide the directional light beams, a multibeam emitter of the multibeam emitter array having a size between one half and two times a size of a light valve of the light valve array.

5. The multiview display of claim 4, wherein a different subset of color sub-pixels of the repeating plurality of color sub-pixels of the array of light valves corresponds to each multibeam emitter of the multibeam emitter array, the different subset representing a multiview pixel of the plurality of multiview pixels of the multiview display.

6. The multiview display of claim 4, further comprising a plurality of multibeam columns spaced apart from one another along a length of the multiview display, a multibeam column of the plurality being configured to provide the directional light beams in a horizontal-only directional pattern,
wherein the plurality of multibeam columns is the array of multibeam emitters and the multiview display is a horizontal parallax-only display.

7. The multiview display of claim 6, wherein the multibeam column comprises a continuous multibeam element.

8. The multiview display of claim 4, further comprising:
a light guide configured to guide light along a length of the light guide; and
an array of multibeam elements spaced apart from one another along the light guide length, a multibeam element of the multibeam element array being configured to scatter out from the light guide a portion of the guided light as the directional light beams,
wherein the multibeam element array is the multibeam emitter array, each multibeam element of the multibeam element array corresponding to a different multibeam emitter of the multibeam emitter array.

9. The multiview display of claim 8, wherein the multibeam element comprises one or more of a diffraction grating configured to diffractively scatter out the portion of the guided light as the directional light beams, a micro-reflective structure configured to reflectively scatter out the portion of the guided light as the directional light beams, and a micro-refractive structure configured to refractively scatter out the portion of the guided light as the directional light beams.

10. The multiview display of claim 8, further comprising a broad-angle backlight adjacent to a side of the light guide opposite to a side adjacent to the light valve array, the broad-angle backlight being configured to provide broad-angle emitted light during a two-dimensional (2D) mode of the multiview display, the light valve array being configured to modulate the broad-angle emitted light as a 2D image,
wherein the light guide and multibeam element array are configured to be transparent to the broad-angle emitted light, the multiview display being configured to display the multiview image during a multiview mode and the 2D image during the 2D mode.

11. A multiview display comprising:
an array of light valves having a repeating plurality of color sub-pixels arranged in offset rows, light valves of the light valve array being arranged as multiview pixels configured to modulate directional light beams as color pixels of a multiview image; and
an array of multibeam emitters configured to illuminate different multiview pixels with different sets of the directional light beams,
wherein adjacent offset rows are offset from one another by an integer multiple of a width of a color sub-pixel, the offset between the adjacent rows being configured to provide a color sub-pixel of a first multiview pixel having a different color than a corresponding color sub-pixel of a second multiview pixel.

12. The multiview display of claim 11, wherein each color sub-pixel of the repeating plurality of color sub-pixels has a different color, the modulated light beams representing the respective different colors within the color pixels of the multiview image.

13. The multiview display of claim 11, wherein a multibeam emitter of the multibeam emitter array comprises an active optical emitter configured to emit light as the directional light beams, the active optical emitter having a size comparable to a size of a light valve of the light valve array.

14. The multiview display of claim 11, further comprising:
a light guide configured to guide light in a propagation direction along a length of the light guide; and
an array of multibeam elements spaced apart from one another along the light guide length, a multibeam element of the multibeam element array corresponding to a multibeam emitter of the multibeam emitter array and having a size comparable to a size of a light valve of the light valve array and being configured to scatter out from the light guide a portion of the guided light as the directional light beams.

15. The multiview display of claim 14, wherein the multibeam element comprises one or more of a diffraction grating, a micro-reflective element and a micro-refractive element optically connected to the light guide to scatter out the portion of the guided light.

16. The multiview display of claim 14, further comprising a light source optically coupled to an input of the light guide, the light source being configured to provide light to be guided in the light guide as guided light one or both of having a non-zero propagation angle and being collimated according to a predetermined collimation factor.

17. A method of multiview display operation comprising:
emitting directional light beams using an array of multibeam emitters; and
modulating the directional light beams using an array of light valves having rows of a repeating plurality of color sub-pixels arranged as a plurality of multiview pixels,
wherein a first row of the repeating plurality of color sub-pixels is offset from a second row of the repeating plurality of color sub-pixels to provide corresponding color sub-pixels in adjacent multiview pixels with different colors to mitigate color fringing associated with color pixels of a multiview image being displayed by the multiview display.

18. The method of multiview display operation of claim 17, wherein each color sub-pixel of the repeating plurality of color sub-pixels has a different color, the modulated light beams representing the respective different colors within the color pixels of the multiview image, and wherein the second row is offset from the first row in a row direction by an integer multiple of a width of a color sub-pixel of the color sub-pixel plurality.

19. The method of multiview display operation of claim 17, wherein emitting the directional light beams comprises using a plurality of multibeam columns spaced apart from one another along a length of the multiview display to emit the directional light beams, each multibeam column of the multibeam column plurality being configured to emit a plurality of directional light beams having directions corresponding to view directions of the multiview display,
   wherein the plurality of multibeam columns is the array of multibeam emitters and the multiview display is a horizontal parallax-only display, the view directions being arranged in a horizontal parallax arrangement.

20. The method of multiview display operation of claim 17, wherein emitting the directional light beams using the array of multibeam emitters comprises:
   guiding light in a light guide as guided light; and
   scattering out a portion of the guided light using a multibeam element of an array of multibeam elements to provide the directional light beams, a size of the multibeam element being comparable to a size of a light valve of the light valve array,
   wherein the multibeam element array is the multibeam emitter array, each multibeam element of the multibeam element array corresponding to a different multibeam emitter of the multibeam emitter array.

* * * * *